(12) United States Patent
Turner et al.

(10) Patent No.: US 6,369,573 B1
(45) Date of Patent: Apr. 9, 2002

(54) APPARATUS FOR REDUCING ROTATION OF A TOWED AIRBORNE ARTICLE

(75) Inventors: Robert John Turner, Salt Ash; Richard Milne Maddever, Elermore Vale; Robert Cornelius Van Den Heuvel, Eleebana, all of (AU)

(73) Assignee: The Broken Hill Proprietary Company Limited (AU)

( * ) Notice: Subject to any disclaimer, the term of this patent is extended or adjusted under 35 U.S.C. 154(b) by 0 days.

(21) Appl. No.: 09/486,855
(22) PCT Filed: Sep. 1, 1998
(86) PCT No.: PCT/AU98/00709
§ 371 Date: Jun. 5, 2000
§ 102(e) Date: Jun. 5, 2000
(87) PCT Pub. No.: WO99/12056
PCT Pub. Date: Mar. 11, 1999
(51) Int. Cl.$^7$ .................. G01V 3/16; G01V 3/165; G01V 3/17; F16F 7/10; F16F 7/116
(52) U.S. Cl. .................. 324/331; 324/225; 324/235
(58) Field of Search .................. 324/330, 331, 324/244, 248, 225, 235; 248/638, 664, 610; 33/344, 345, 346

(56) References Cited

U.S. PATENT DOCUMENTS

| 3,836,841 | A | * | 9/1974 | Morrison ................ 324/5 |
| 4,639,675 | A | * | 1/1987 | Hinton ................ 324/334 |
| 5,117,695 | A | * | 6/1992 | Henderson et al. ........ 73/493 |

* cited by examiner

Primary Examiner—Safet Metjahic
Assistant Examiner—Reena Aurora
(74) Attorney, Agent, or Firm—Olson & Hierl, Ltd.

(57) ABSTRACT

An apparatus for reducing rotation of an article such as a bird for holding a superconducting quantum interference device for use in airborne transient electromagnetic mineral prospecting. The apparatus includes a support sphere having an inner shell and an outer shell. Liquid is contained between the inner and outer shells and a sphere has openings through which support strings project for locking to an internal point within the sphere. The strings have one end connected to an internal point within the support sphere and another end connected to a spring. The spring includes a damper for damping movement of the spring. Baffles are arranged in the cavity between the inner and outer shells in which the liquid is contained for damping movement of the liquid.

15 Claims, 4 Drawing Sheets

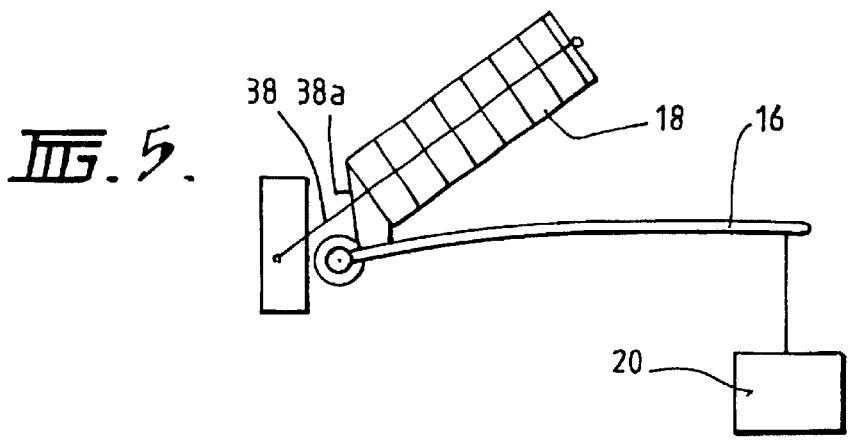
FIG. 5.
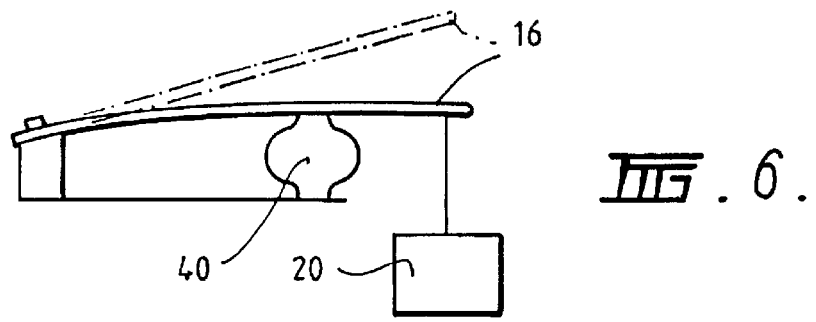
FIG. 6.
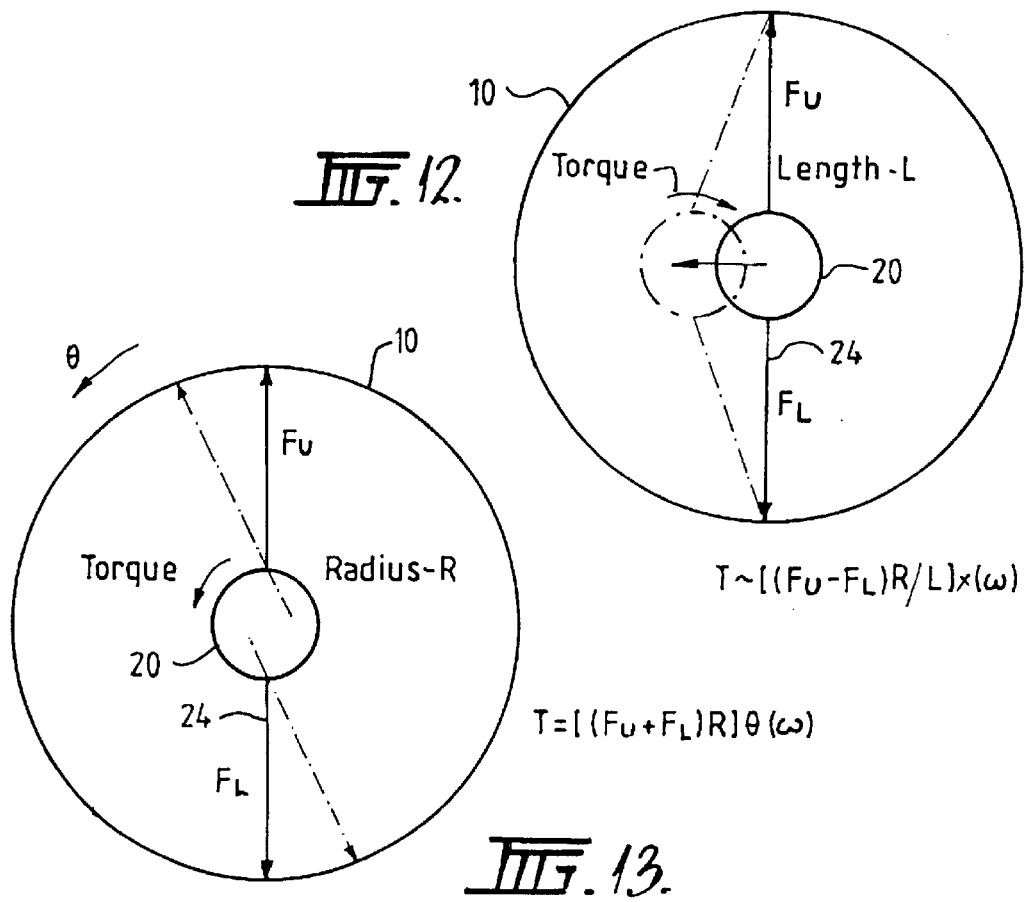
FIG. 12.
$$T \sim [(F_U - F_L)R/L] \times (\omega)$$
FIG. 13.
$$T = [(F_U + F_L)R]\theta(\omega)$$

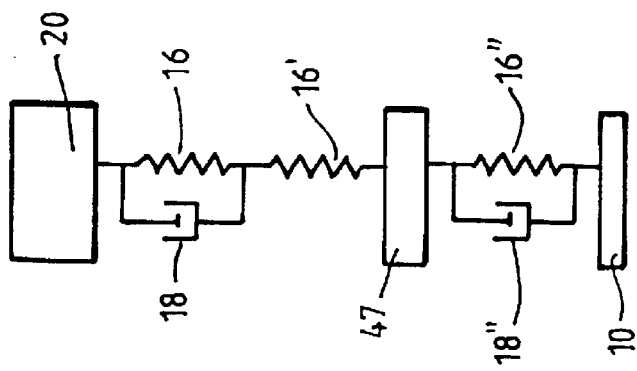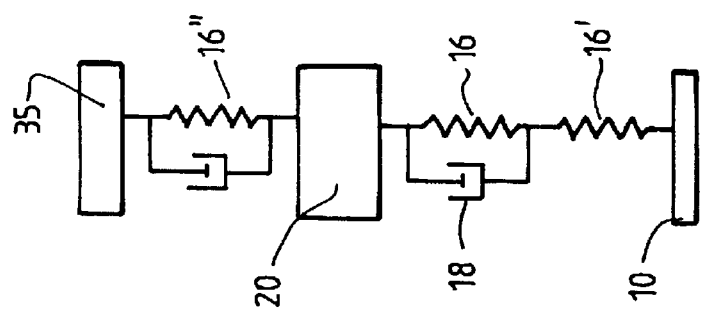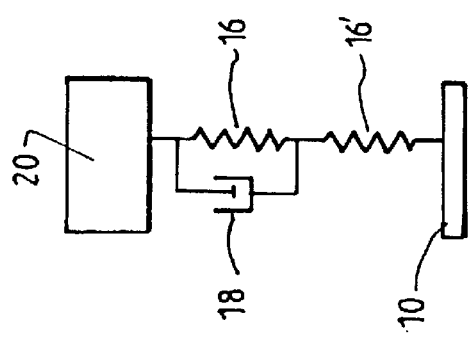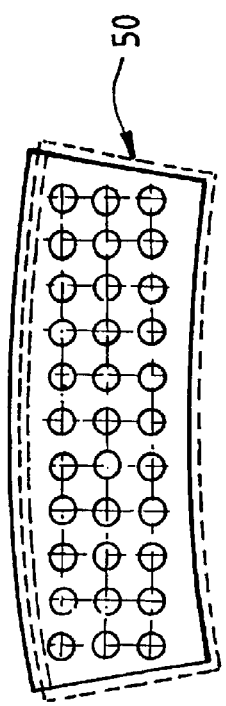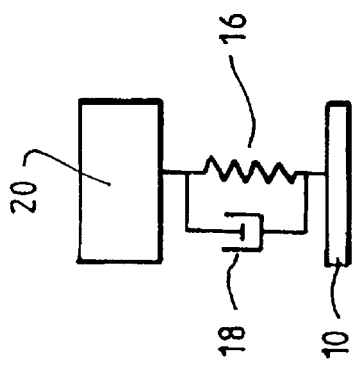

APPARATUS FOR REDUCING ROTATION OF A TOWED AIRBORNE ARTICLE

This invention relates to an apparatus for reducing rotation of an article and, in particular, but not exclusively, to an apparatus for reducing rotation of a super conducting quantum interference device (SQUID) in the earth's magnetic field. The invention has particular application to airborne transient electromagnetic mineral prospecting. However, it should be understood that the invention has application to environments other than transient electromagnetic mineral prospecting and to payloads other than SQUID magnetometers and, indeed, could be used in many environments in which it is desired to reduce rotational movement of a payload at a particular frequency.

Transient electromagnetic mineral prospecting involves subjecting the ground to a large pulsating magnetic field which is produced by an excitation coil usually mounted on an aircraft. A current is periodically supplied to the aircraft mounted coil for producing the magnetic field. During intervals in which current flows, the ground is magnetised by the magnetic field and during intervals in which no current flows, the ground maintains a residual magnetism which eventually decays. The decay of the residual magnetism is related to the electrical conductivity of the ground and the decaying magnetic field can thereby provide an indication of minerals below the earth's surface.

In order to detect the decaying magnetic field, the aircraft tows a bird (which is generally in the form of a hollow tear-shaped container). The bird supports a SQUID magnetometer which measures the decaying magnetic field and thereby provides an indication of the material below the surface of the earth in the area being surveyed.

The decaying magnetic field which is of interest is many magnitudes smaller than the magnetic field created by the excitation coil. The field created by the excitation coil is also several magnitudes smaller than the earth's magnetic field at the location of the SQUID magnetometer. Since the decaying magnetic field is usually detected during periods when the current in the excitation coil is not flowing, the decaying magnetic field can be easily distinguished from the magnetic field produced by the aircraft mounted coil.

In order to distinguish the decaying field from the earth's magnetic field, electronic circuitry associated with the SQUID magnetometer compensates for apparent changes in the earth's magnetic field. Linear movement of the SQUID magnetometer through the earth's magnetic field will not interfere to the same extent with monitoring of the decaying field which is of interest. However, since the SQUID magnetometer in the bird is towed by the aircraft, the bird and therefore the SQUID magnetometer is subject to considerable buffeting and movement. Any rotation of the SQUID magnetometer in the earth's magnetic field will result in a signal which can be confused with the signal of interest which relates to the decaying field.

The object of the present invention is to provide an apparatus which reduces rotation of an article, such as a SQUID magnetometer relative to a particular datum such as the earth's magnetic field.

The invention, in a first aspect, may be said to reside in an apparatus for reducing rotation of an article at a desired frequency including:

an article support member for supporting the article, the article support member having an inner shell and an outer shell defining a cavity for receiving a damping liquid;

baffle means within the cavity for damping movement of the support member with respect to the damping liquid; and suspension means for suspending the support member.

The particular frequency at which it is desired to reduce rotation will depend on the application and payload involved. For SQUID magnetometers supported in a bird, the desired frequency may be approximately 25 Hz. However, in other environments, different frequencies may be of importance.

Preferably the suspension means comprises a plurality of strings each having a first end and a second end, the first end of the strings being coupled to the support member and the second end of the strings being coupled to a respective spring member.

Preferably the support member is substantially spherical in configuration and includes holes through the inner and outer shells through which the strings pass, and an internal anchoring point within the spherical support member for anchoring the first end of the strings.

Preferably the spring members include damping means for damping movement of the spring members.

In one embodiment of the invention, the damping means includes resilient pads. In another embodiment, the damping means includes air bellows.

Preferably the spherical support member includes an internal frame structure for supporting the article.

Preferably the article is a dewar for containing a SQUID magnetometer.

Preferably the support member includes a counterweight for balancing the dewar when supported in the support member.

The invention, in a second aspect, may be said to reside in an apparatus for reducing rotation of an article, at a desired frequency including:

an article support member for supporting the article;

a plurality of strings coupled to the article support member at one end;

a plurality of spring members respectively coupled to each of the plurality of strings at the other end of the strings; and a holding means to which the plurality of spring members is coupled.

Preferably the article support member comprises a spherical support member having an inner shell and an outer shell defining a cavity for receiving a damping liquid.

Preferably the holding means comprises a bird for towing by an aircraft.

Preferably each of the spring members includes a damping means and preferably the damping means comprises resilient pads or air bellows.

Preferably the article is a dowar for containing a SQUID magnetometer.

In yet a further aspect of the invention, there is provided a bird for towing behind an aircraft to move a SQUID magnetometer over an area to be surveyed, the bird including:

a casing defining an interior space;

a support member located in the interior space for supporting the SQUID magnetometer; and anti-rotation means for reducing rotation of the support member and therefore the SQUID magnetometer relative to the magnetic field of the earth.

Preferably the support member comprises an inner shell and an outer shell defining a cavity for receiving a damping liquid.

Preferably the anti-rotation means comprises baffle means in the cavity and a plurality of spring members coupled to the caning and a plurality of strings respectively connected to the spring members and to the support member for suspending the support member within the casing.

Preferred embodiments of the invention will be described, by way of example, with reference to the accompanying drawings in which:

FIG. 5 is a schematic view showing one form of damping according to one embodiment of the invention;

FIG. 6 is a view showing a further form of damping according to another embodiment of the invention;

FIG. 7 is a view showing a baffle plate used in the preferred embodiment of the invention;

FIGS. 8, 9, 10 and 11 are schematic views showing various suspension arrangements; and FIGS. 12 and 13 are diagrams illustrating operation of the apparatus according to the preferred embodiment of the invention.

The preferred embodiment of the invention will be described with reference to the support of a SQUID magnetometer for airborne transient electromagnetic prospecting in which the apparatus according to the preferred embodiment of the invention reduces the amount of angular motion which the SQUID magnetometer would otherwise suffer as it is towed through the air.

Figure 1:
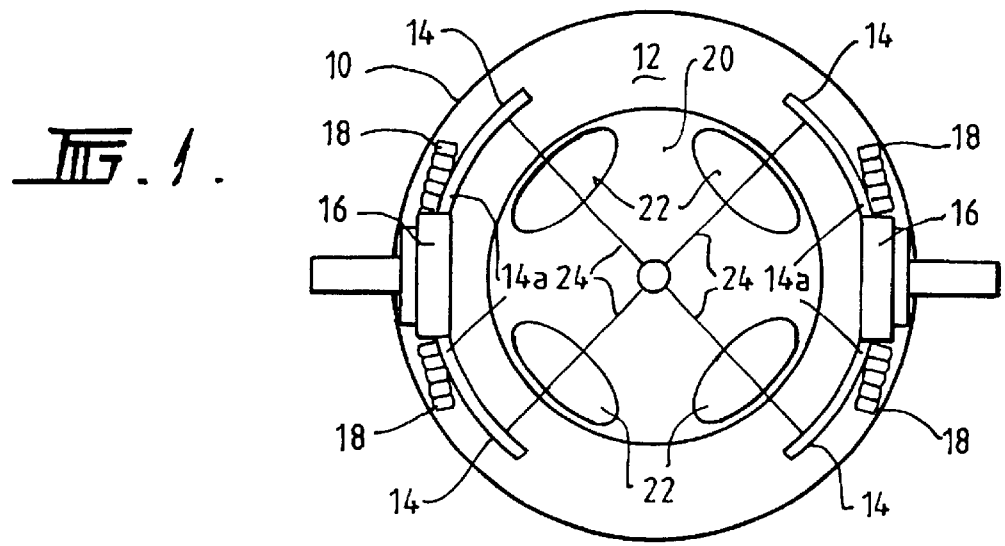
FIG. 1 is a schematic view of an apparatus embodying the invention.

FIG. 1 is a schematic representation of the apparatus according to the preferred embodiment of the invention. A bird 10 of generally known structure is intended to be towed behind or supported under an aircraft (not shown) to move a SQUID magnetometer (not shown) over an area to be surveyed. The bird 10 defines an internal space 12 in which is mounted a plurality of leaf springs 14. The leaf springs 14 are mounted in cantilever fashion so that one end 14a is attached to a suitable coupling mechanism 16 attached to the internal surface of the bird 10. Each of the springs 14 is provided with a damper 18 for damping movement of the respective spring 14.

A support member 20 in the form of a hollow spherical ball is arranged within the space 12. The support member 20 is generally spherical in configuration having eight holes 22 (of which four are shown). A plurality of springs 24 have one end connected to a respective spring 14 and the other end to an anchoring point within the spherical support member 20.

Figure 2:
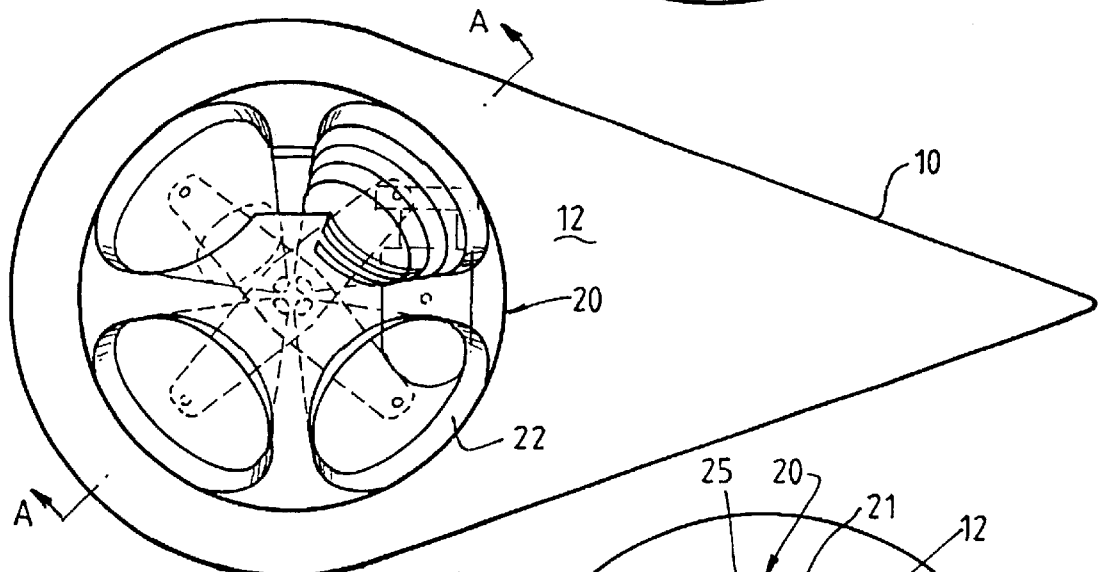
FIG. 2 is a view of the apparatus in further detail.
Figure 3:
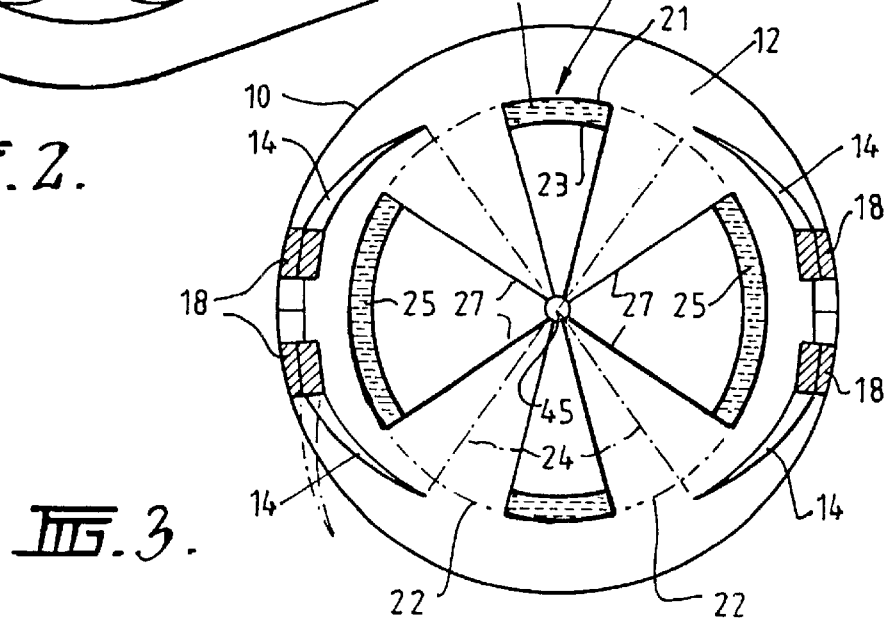
FIG. 3 is a view along the line A—A of FIG. 2.

FIGS. 2 and 3 show the apparatus in more detail. As shown in FIG. 2, the bird 10 is of teardrop configuration and the spherical mounting member 20 is located at the large diameter end of the bird 10.

As is best shown in FIG. 3, the spherical support member 20 has an outer shell 21 and an inner shell 23 which define a cavity 25 therebetween. A damping liquid such as water fills the cavity 25 completely so that there is no air space or bubbles within the cavity 25. The support member 20 may also have a device for removing air bubbles, such as a suction device (not shown), so that any bubbles which may form in the cavity 25 from dissolved air in the water after sealing of the support member can be removed. The spherical ball member 20 also supports an internal frame structure 27 for providing some rigidity to the spherical support member 20 and also providing a support for a dewar (not shown in FIGS. 2 and 3) within which the SQUID magnetometer is located.

Figure 4:
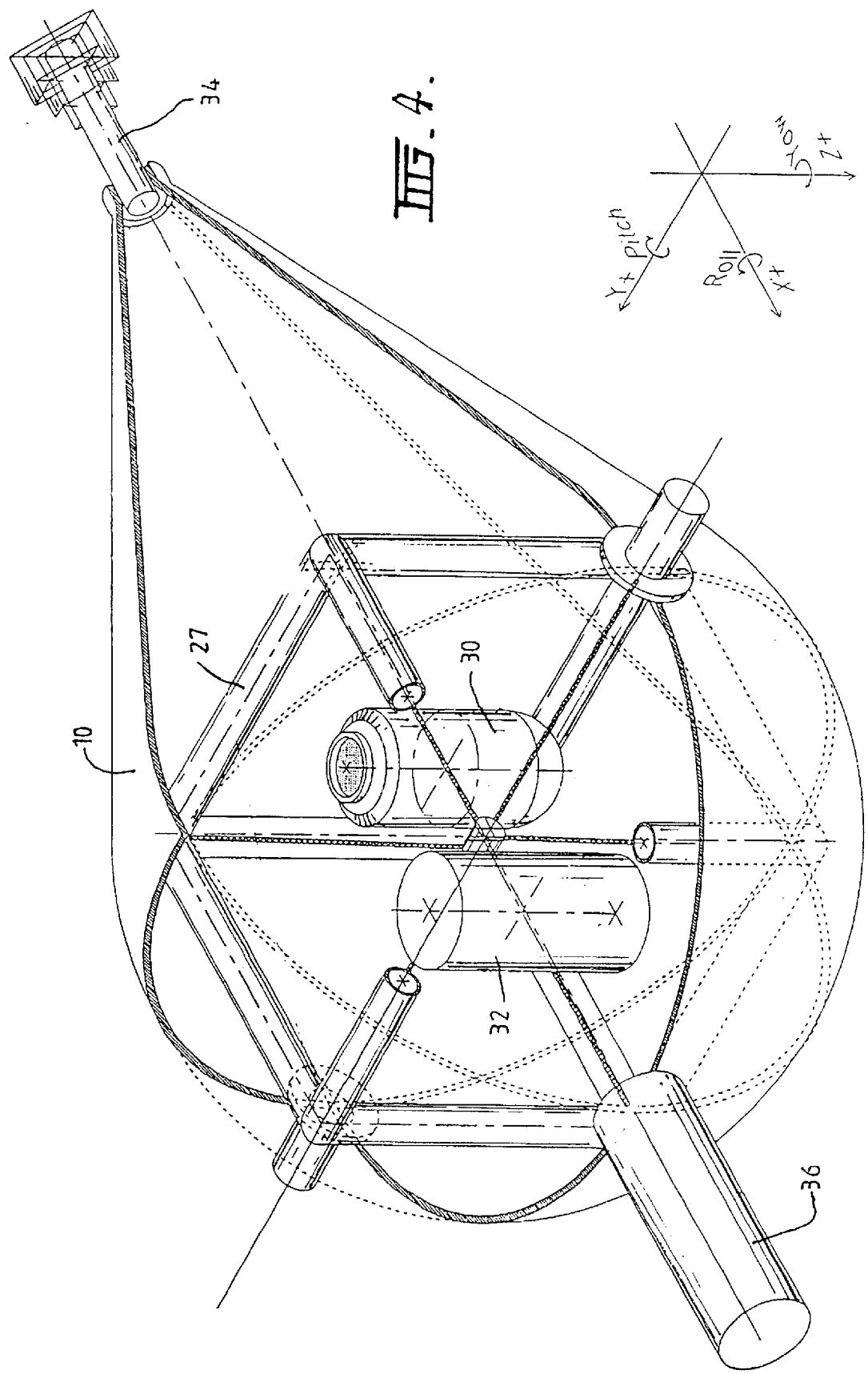
FIG. 4 is a view in schematic form showing further detail of a bird according to the preferred embodiment of the invention.

FIG. 4 is a schematic broken away view of the bird 10 showing in schematic form the frame structure 27 and also a dewar 30 and counterweight 32 which can be supported by the frame 27 within the spherical support member 20. The dewar 30 typically contains a cryogenic liquid such as liquid nitrogen, liquid helium or the like in which the SQUID magnetometer is immersed for maintaining the SQUID magnetometer at the correct operating temperature. The counterweight 32 simply balances the weight of the dewar 30 within the spherical support structure 20.

The bird 10 may include a high drag tail 34 at one end and a coupling schematically shown at 36 for connecting the bird to a tether for towing behind an aircraft (not shown).

FIG. 5 shows one embodiment of damping 18 associated with each spring 14. In the embodiment of FIG. 5, the damping 18 comprises a plurality of resilient pads which are tied together by a line 38 so that when the spring 16 is flexed by movement of the spherical support member 20, the resilient pads 18 are compressed by the line 38 against a back plate 38a so as to apply a restoring force to dampen movement of the spring 16.

In the embodiment of FIG. 6, the damping comprises an air bellows 40 which, when spring 16 moves, expresses air from the interior of the bellows 40 to an orifice of precise diameter to dampen movement of the spring 16.

Arranged within the cavity 25 are a plurality of damping baffles 50 shown in FIG. 7. The baffles 50 (not shown in FIGS. 1 to 6) are arranged within the cavity 25 for damping rotational movement of the ball 20 as will be described in more detail hereinafter.

In the embodiment shown in FIG. 7, the baffle 50 merely comprises an apertured plate. In other embodiments, the baffle 50 could be in the form of a block with venturi-shaped passages through the block.

The strings 24 are anchored to an anchorage location 45 (see FIG. 3) provided on the frame structure 27 within the spherical support member 20. As can be seen in FIG. 3, the strings 24 are not anchored at the exact centre point of the spherical support member 20, but rather are offset from the centre of the spherical member 20 by a prescribed distance. In the preferred embodiment of the invention, the spherical member 20 has a diameter of approximately 340 mm and the strings 24 at their anchoring points on the anchorage 45 are spaced radially from the centre of the spherical member 20 by a distance of approximately 8 mm.

FIGS. 8 to 11 show various embodiments of spring and damping arrangements which can be employed to obtain successively greater reduction of payload motion.

FIG. 8 shows the simplest arrangement in which spring 16 and damper 18 are arranged in parallel. FIG. 9 shows an arrangement with a double spring arrangement in which a second spring 16' is arranged in series with the spring 16 and damper 18. FIG. 10 shows an arrangement in which the damping is the same as in FIG. 9 between bird 10 and the spherical support member 20 with a further spring and damping arrangement 16" arranged between the member 20 and auxiliary mass 35. FIG. 11 shows yet a further arrangement in which a frame 47 is interposed between the bird 10 and the support member 20 with the frame 47 being suspended by a spring 16" and damper 18".

To minimize angular motion of the SQUID magnetometer, the SQUID magnetometer obviously cannot be rigidly attached to the bird 10 because the bird undergoes vastly more rotational motion than would be permitted at the frequency of interest. The apparatus for reducing rotation according to the preferred embodiments of the invention provides a suspension system for mounting the SQUID magnetometer within the bird to reduce and most preferably eliminate any rotational movement of the SQUID magnetometer with reference to the earth's magnetic field. The apparatus according to the preferred embodiments of the invention comprises two main parts, one which seeks to damp out translational motion and which basically comprises the strings 24, springs 14 and dampers 18 and another part which minimizes rotational motion and which is comprised by the spherical support member 20 having the outer shell 21 and inner shell 23 which define the cavity 25 for containing the damping liquid and baffle plates 50. Although strictly speaking, translational motion does not degrade measurements in practice, any translational motion nearly always suffers some parametric conversion into rotational motion. Thus, one of the main imports of the translational system provided by the springs 14, damper 18 and strings 24 is to minimise the cross-coupling between translation and rotation.

The damping liquid, such as deionised water, within the cavity 25 fills the cavity 25 between the shells 21 and 23 and therefore gives the system a large moment of inertia. The water is viscously coupled to the shells 21 and 23 through the use of the internal baffles 50. Consequently, when an external torque is applied to the spherical member 20, an angular acceleration results which is initially equal to the torque divided by the moment of inertia. The rotational energy rapidly dissipates as a consequence of the viscous damping and thus the oscillation of the spherical member 20 is kept to a minimum.

AS previously explained, the strings 24 which support the member 20 are attached at points roughly 8 mm from the centre of the spherical member 20. The strings 24 and the springs 14 and dampers 18 damp out as much translational motion as possible since translational motion will cross-couple into rotational motion thereby compromising the performance of the SQUID magnetometer.

Cross-coupling can be best understood with reference to FIG. 12. Assuming that the strings 24 exert a combined force of the spherical member 20 which is equal to $F_U$. This will be equal to the weight of the member 20 plus the force exerted by the lower springs, $F_L$. It is principally because $F_U \neq F_L$ and also because the strings 24 do not meet precisely in the centre of the ball that cross-coupling occurs. If the upper and lower forces were equal then if the member 20 moved sideways through a distance x, the restoring force would be the same both top and bottom and there would be no net torque on the ball. Because these forces are different, however, there is a torque on the ball which is approximately given by the expression shown. For a system in static equilibrium the term $F_U-F_L$ is a constant and is precisely equal to the mass of the member 20, $m_B$, times the gravitational constant g. There is little that can be done to change that, however, it can be seen that the torque is proportional to the radius of the attachment points and inversely proportional to the length of the strings 24. Clearly the longer the strings 24 and the smaller the radius the lower will be the torque. Of particular interest is the remaining term, $x(\omega)$ which describes the displacement and is a function of the translational oscillation frequency, $\omega$. To minimise the torque it is obviously desirable that the translational displacement be kept as small as possible.

Additional translational cross-coupling will occur if there is a mass imbalance of the total suspended mass. A means to adjust the mass balance in each of three directions, such as counterweights, needs to be included on spherical member 20.

Apart from translational cross-coupling, rotational motion of the sensor will also occur quite simply if the bird 10, to which the springs are attached, rotates. This is depicted in FIG. 13. Here the restoring torque is proportional to the rotation angle $\theta(\omega)$ and to the sum of the upper and lower spring forces and as well as to the attachment radius R, once more. It should at this stage be pointed out that the restoring torques cannot be made arbitrarily small; some restoring force is required, otherwise there would be no way of maintaining the correct orientation of the SQUID magnetometer. Consequently the radius, R, cannot be shrunk completely to zero. At the same time, however, it is important that this non-zero restoring torque occur essentially at low frequencies and be negligible in the frequency range of interest (>20 Hz). It should also be mentioned that it is not torque per se which is of concern but rotational motion. Consequently, the moment of inertia—to which angular acceleration is inversely proportional—is a critical parameter. It is desirable that the moment of inertia be large while keeping the overall mass small and this is one of the reasons that the water is concentrated in a spherical member 20 as far from the centre of the member 20 as possible.

Since modifications within the spirit and scope of the invention may readily be effected by persons skilled within the art, it is to be understood that this invention is not limited to the particular embodiments described by way of example hereinabove.

The claims defining the invention are as follows:

1. An apparatus for reducing rotation of an article at a desired frequency including:
    an article support member for supporting the article, the article support member having an inner shell and an outer shell defining a cavity for receiving a damping liquid;
    baffle means within the cavity for damping movement of the support member with respect to the damping liquid; and
    suspension means for suspending the support member.

2. The apparatus of claim 1, wherein the suspension means comprises a plurality of strings each having a first end and a second end, the first end of the strings being coupled to the support member and the second end of the strings being coupled to a respective spring member.

3. The apparatus of claim 2, wherein the support member is substantially spherical in configuration and includes holes through the inner and outer shells through which the strings pass, and an internal anchoring point within the spherical support member for anchoring the first end of the strings.

4. The apparatus of claim 2, wherein the spring members include damping means for damping movement of the spring members.

5. The apparatus of claim 1, wherein the spherical support member includes an internal frame structure for supporting the article.

6. The apparatus of claim 5, wherein the article is a dewar for containing a SQUID magnetometer.

7. The apparatus of claim 1, wherein the support member includes a counterweight for balancing the dewar when supported in the support member.

8. An apparatus for reducing rotation of an article, at a desired frequency including:
    an article support member for supporting the article;
    a plurality of strings coupled to the article support member at one end;

a plurality of spring members respectively coupled to each of the plurality of strings at the other end of the strings; and a holding means to which the plurality of spring members is coupled.

9. The apparatus of claim 8, wherein the article support member comprises a spherical support member having an inner shell and an outer shell defining a cavity for receiving a damping liquid.

10. The apparatus of claim 8, wherein the holding means comprises a bird for towing by an aircraft.

11. The apparatus of claim 8, wherein each of the spring members includes a damping means.

12. The apparatus of claim 8, wherein the article is a dowar for containing a SQUID magnetometer.

13. A bird for towing behind an aircraft to move a SQUID magnetometer over an area to be surveyed, the bird including:

a casing defining an interior space;

a support member located in the interior space for supporting the SQUID magnetometer; and anti-rotation means for reducing rotation of the support member and therefore the SQUID magnetometer relative to the magnetic field of the earth.

14. The bird of claim 13, wherein the support member comprises an inner shell and an outer shell defining a cavity for receiving a damping liquid.

15. The bird of claim 13, wherein the anti-rotation means comprises baffle means in the cavity and a plurality of spring members coupled to the casing and a plurality of strings respectively connected to the spring members and to the support member for suspending the support member within the casing.

* * * * *